US009695894B2

(12) United States Patent
Falter et al.

(10) Patent No.: US 9,695,894 B2
(45) Date of Patent: Jul. 4, 2017

(54) CALIPER DISC BRAKE OF A VEHICLE, IN PARTICULAR A COMMERCIAL VEHICLE, AND HOLDING-DOWN SPRING OF SUCH A BRAKE

(71) Applicant: WABCO EUROPE BVBA, Brussels (BE)

(72) Inventors: Wolfgang Falter, Heidelberg (DE); Oliver Friebus, Heidelberg (DE); Hellmut Jäger, Ludwigshafen (DE); Hans-Christian Jungmann, Gorxheimertal (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 14/890,437

(22) PCT Filed: Apr. 23, 2014

(86) PCT No.: PCT/EP2014/001084
§ 371 (c)(1),
(2) Date: Nov. 11, 2015

(87) PCT Pub. No.: WO2014/183829
PCT Pub. Date: Nov. 20, 2014

(65) Prior Publication Data
US 2016/0108979 A1 Apr. 21, 2016

(30) Foreign Application Priority Data
May 13, 2013 (DE) .......................... 10 2013 008 160

(51) Int. Cl.
*F16D 65/097* (2006.01)
*F16D 55/226* (2006.01)
(Continued)

(52) U.S. Cl.
CPC ......... *F16D 65/0978* (2013.01); *F16D 55/22* (2013.01); *F16D 55/226* (2013.01); *F16D 65/092* (2013.01)

(58) Field of Classification Search
CPC .... F16D 55/224; F16D 55/225; F16D 55/226; F16D 55/227; F16D 65/0006;
(Continued)

(56) References Cited

U.S. PATENT DOCUMENTS 3,768,605 A * 10/1973 Carre .................. F16D 55/2262
188/73.36
4,428,463 A * 1/1984 Burgdorf ............ F16D 65/0976
188/73.38

(Continued)

FOREIGN PATENT DOCUMENTS

DE 10 2007 036353 B3 2/2009
DE 10 2008 029044 A1 12/2009
(Continued)

OTHER PUBLICATIONS

European Patent Office, Rijswijk, Netherlands, International Search Report of International Application No. PCT/EP2014/001084, Mailed Jul. 24, 2014, 2 pages.

*Primary Examiner* — Robert A Siconolfi
*Assistant Examiner* — San Aung
(74) *Attorney, Agent, or Firm* — Brinks Gilson & Lione

(57) ABSTRACT

A caliper disc brake of a vehicle, in particular of a commercial vehicle, a brake disc, a brake caliper, a brake support plate, a force transmission element, such as, for example, a pad support and/or a pressure plate, which is guided and supported in a well of the brake caliper or of the brake anchor plate, a holding-down spring (32) for holding down the force transmission element, and a holding-down device (36). The holding-down device is held by a holding device, pretensions the holding-down spring radially against the (Continued)

force transmission element and pretensions the holding-down spring tangentially in the direction of rotation against the force transmission element during forwards travel. The holding-down spring has two identical spring legs that enclose an angle of more than 95° with the base in the relaxed state and an angle of less than 85° with the respectively adjacent spring leg.

8 Claims, 13 Drawing Sheets

(51) Int. Cl.
    *F16D 55/22*     (2006.01)
    *F16D 65/092*     (2006.01)

(58) Field of Classification Search
    CPC ............... F16D 65/092; F16D 65/0972; F16D 65/0977; F16D 65/0978; F16D 65/0979
    USPC ..................... 188/73.38, 73.31, 73.35, 71.1
    See application file for complete search history.

(56) References Cited

U.S. PATENT DOCUMENTS

| | | | | |
|---|---|---|---|---|
| 5,875,873 | A * | 3/1999 | Kay | ...................... F16D 55/224 188/73.37 |
| 7,837,015 | B2 * | 11/2010 | Klement | ............. F16D 65/0977 188/73.35 |
| 2004/0262099 | A1 * | 12/2004 | Crippa | .................... F16D 55/22 188/73.35 |
| 2008/0006489 | A1 * | 1/2008 | Morio | ................. F16D 65/0977 188/73.38 |
| 2010/0116600 | A1 * | 5/2010 | Wolf, Jr. | ............. F16D 65/0978 188/73.31 |
| 2010/0252370 | A1 * | 10/2010 | Raffin | ................. F16D 65/0978 188/1.11 W |

FOREIGN PATENT DOCUMENTS

| | | |
|---|---|---|
| EP | 0 694 707 A2 | 1/1996 |
| EP | 2 184 506 A1 | 5/2010 |

* cited by examiner

CALIPER DISC BRAKE OF A VEHICLE, IN PARTICULAR A COMMERCIAL VEHICLE, AND HOLDING-DOWN SPRING OF SUCH A BRAKE

TECHNICAL FIELD

The invention relates to a caliper disc brake of a vehicle, in particular a commercial vehicle, with a brake disc having an axis of rotation, a brake caliper, a brake support plate, a force transmission element, such as, for example, a pad support and/or a pressure plate, which is guided and supported in a well of the brake caliper or of the brake support plate, a holding-down spring for holding down the force transmission element, and a holding-down device, which is held and supported on the caliper by a holding device and which preloads the holding-down spring radially against the force transmission device and preloads the holding-down spring tangentially in the direction of rotation against the force transmission device during forward travel, wherein the holding-down device has a center line parallel to the axis of rotation.

BACKGROUND OF THE INVENTION

Brakes of the type stated at the outset are known, e.g. from EP 694 707 B3. The offsetting of the axis of the holding-down clip by means of the eccentric positive support in the brake caliper in order, by means of the positive engagement in the holding-down springs shaped specifically for the purpose, to exert not only the radial but also a tangential preload on the brake pads is characteristic of the prior art brakes.

The basic principle of radial and tangential preloading has proven its worth and is to be retained. According to the invention, however, design changes and functional changes are made to the brake caliper and to the relevant parts of the holding-down system in order to achieve greater economy and greater versatility.

FIGS. 1 and 2 show the brake according to EP 694 707 B3. Here, FIG. 1 shows a brake pad 11, which is guided and supported radially inward and on both sides in the circumferential direction in a well-type guide in the brake caliper or brake support plate and on the radially outer edge of which a holding-down spring formed symmetrically on both sides relative to the central axis thereof is supported. Centrally, the holding-down spring has a central region 3 which is radially lower-lying, from which the spring legs 6, 7, situated at a higher level, extend outward on both sides along the outer edge of the pad in order then to act resiliently at the ends on the brake pad when a holding-down clip 1, likewise formed symmetrically, engages positively in the central region, which is formed radially inward here.

The holding-down clip 1 is formed from round stock. The spring preload comes into effect when, as shown in FIG. 2, the holding-down clip 1 is anchored in positive-engagement openings in the brake caliper on the brake application side and is then fastened firmly but releasably on the other side by means of screw fastening on a bearing block of the brake caliper on the rim side. The holding-down clip extends over a caliper opening used for the installation/removal of the brake pads supported on both sides of the brake disc and extends in a direction toward the brake or central axis A.

In the axial direction of the brake pads, the holding-down springs are coupled to the brake pad because radial projections 12, 14 from the outer edge of the brake pad pass through elongate openings 8, 9, 10 in the spring. At the ends, the spring legs rest against further radial projections 13, 13 on the outer edge of the brake pad. The holding-down springs are designed as leaf springs.

According to the prior art, the radial and tangential preload acting on the brake pad by means of the holding-down spring is produced by the fact that the holding-down clip 1 engages positively in the radially formed central region 3 of the holding-down spring and, for its part, is always supported in the direction of the brake disc exit side in an offset manner with an axial offset x relative to the central or brake axis A in the direction of rotation of the brake disc during forward travel, with positive engagement in application-side and rim-side anchorings of the brake caliper. As a result, the corresponding spring leg is also urged in a tangential direction. For the eccentric positive support of the holding-down clip 1, the necessary cast recesses must be present in corresponding positions in the casting for the brake caliper, and these have then subsequently to be subjected to mechanical machining operations. The points of support for the holding-down clip 1 are thus formed asymmetrically on/in the brake caliper.

The brakes concerned are installed on both sides of the axle, and therefore they must also be embodied mirror-image fashion. This means that different casting model embodiments are required for prior art brake calipers for a left-hand and a right-hand brake in order to produce the asymmetrical supporting and holding regions. Accordingly, the positions for the subsequent mechanical machining on the supporting and holding regions are also different for a left-hand brake and a right-hand brake.

Another problem with conventional brakes, especially the brake according to EP 694 707 B3, is that, owing to the overall design of the brake and the spring, the holding-down spring is subject to unfavorable loads in mechanical respects.

It is the underlying object of the invention to develop the brake according to EP 694 707 B3 in such a way that the disadvantages mentioned are eliminated. In particular, it is the underlying object of the invention to configure the holding-down spring in such a way that it is subject to lower mechanical loads in operation.

According to the invention, the stated object is achieved, in the case of a caliper disc brake of the type stated at the outset, by virtue of the fact that the holding-down spring has two identical spring legs and a trapezoidal central region which is located in between and projects radially inward, wherein the two legs of the trapezoidal region each enclose an angle of more than 95° with the base in the relaxed state and an angle of less than 85° with the respectively adjacent spring leg.

This embodiment of the holding-down spring is mechanically particularly advantageous.

According to the invention, provision is preferably made, in the relaxed state, for the holding-down spring in each case to extend in an arc with a radius of 10 mm to 16 mm in the transitional region between the two legs of the trapezoidal region and the base thereof and in an arc with a radius of 4 mm to 9.5 mm in the transitional region between the trapezoidal region and the spring legs.

Considerable mechanical advantages are also achieved by this means.

As another preferred option, it is envisaged that the holding-down spring is symmetrical and, owing to the symmetry, can be installed in two installation positions rotated by 180° relative to one another.

Mix-ups are thereby avoided.

Another preferred option according to the invention is that the holding-down spring is a leaf spring.

According to another preferred embodiment of the invention, it is envisaged that the holding-down device rests on the holding-down spring by means of a bead-shaped first region to produce the radial preload and rests on said spring by means of a second region to produce the tangential preload, and the distance between the central point of the first region and the central point of the second region is smaller in a radial direction than in a tangential direction.

This embodiment once again contributes to the relief of mechanical loads on the holding-down spring.

In addition to the caliper disc brake described in detail above, the invention also provides a related holding-down spring.

Further aspects of the invention are explained in greater detail below by means of preferred illustrative embodiments with reference to the attached drawings. The drawings are provided for purely illustrative purposes and are not intended to limit the scope of the present invention.

DETAILED DESCRIPTION OF THE DRAWINGS

Figure 3:
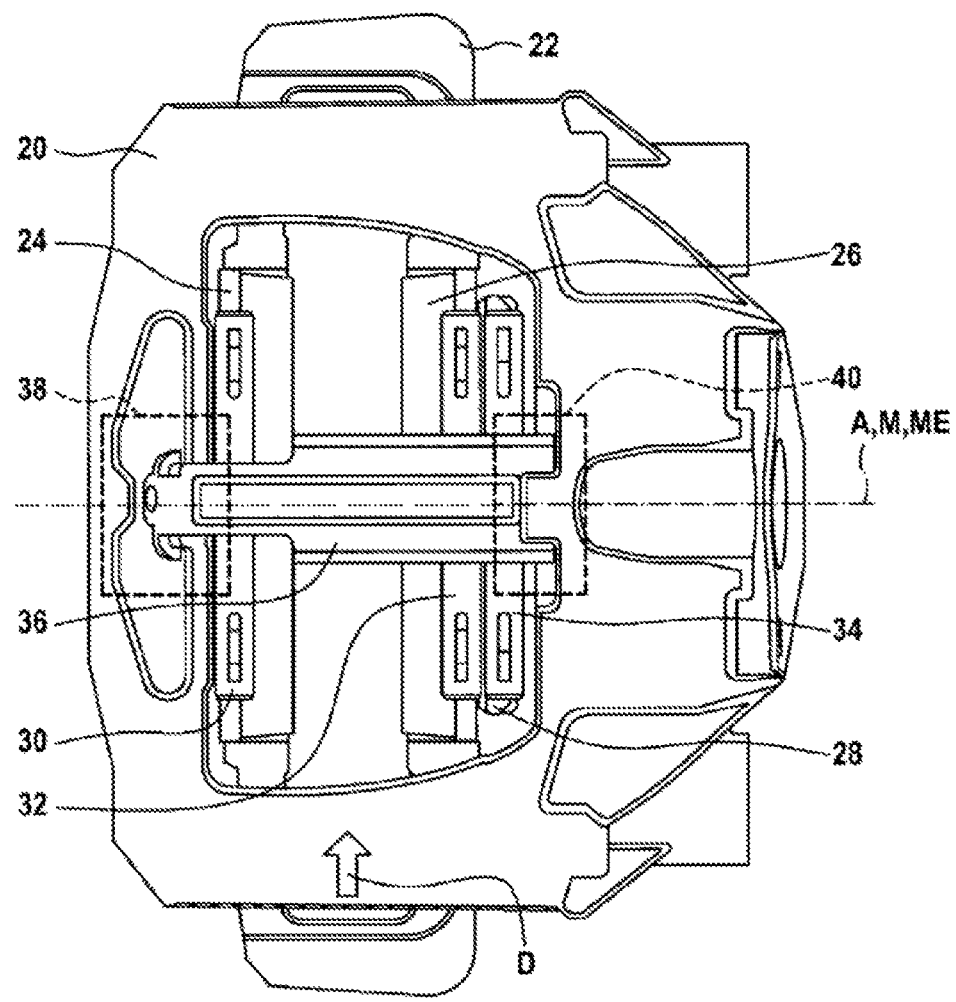
FIGS. 3 and 4 show schematic plan views of a caliper disc brake according to one illustrative embodiment of the invention.
Figure 4:
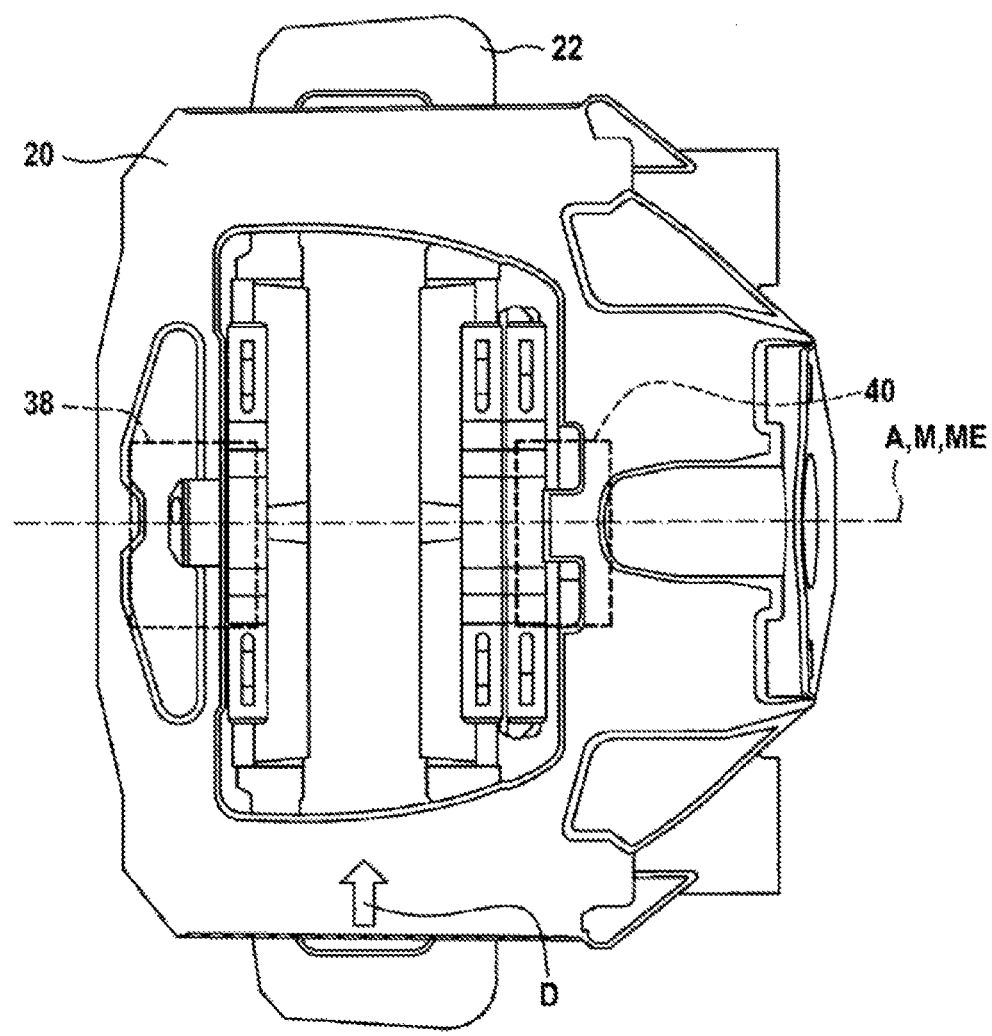
Figure 5:
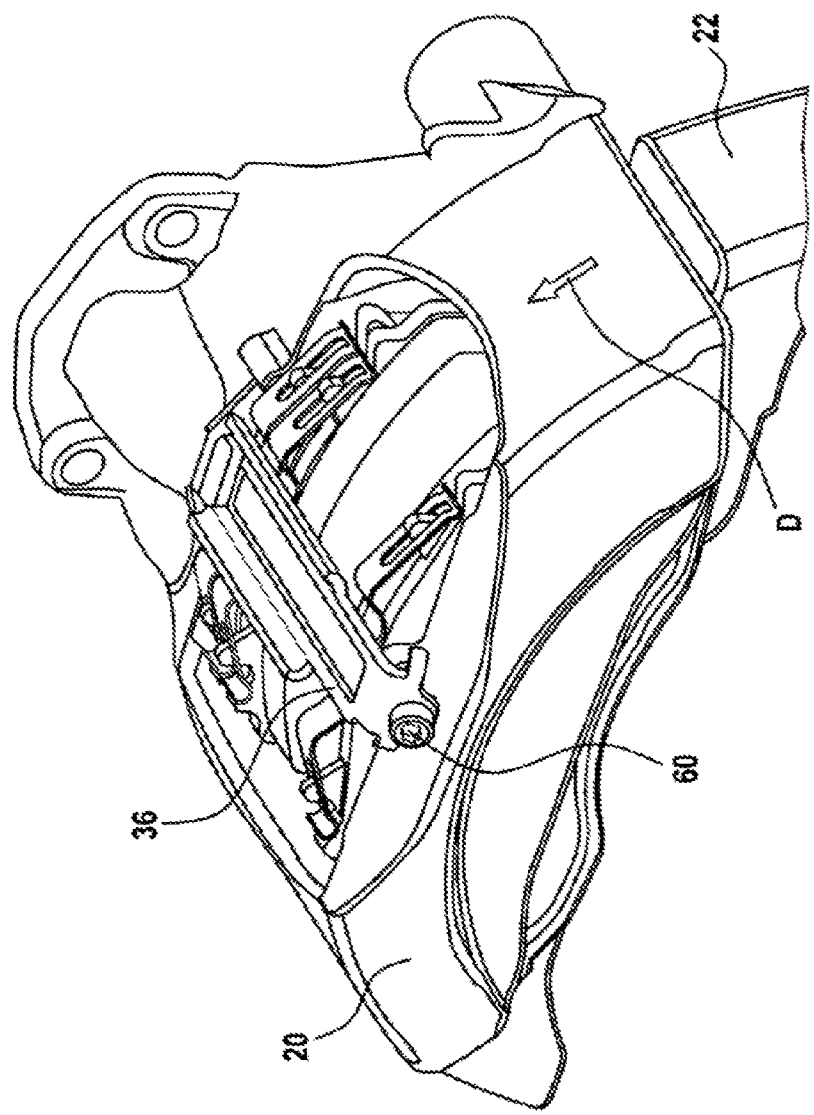
FIG. 5 shows a schematic perspective view of the brake according to FIGS. 3 and 4.
Figure 6:
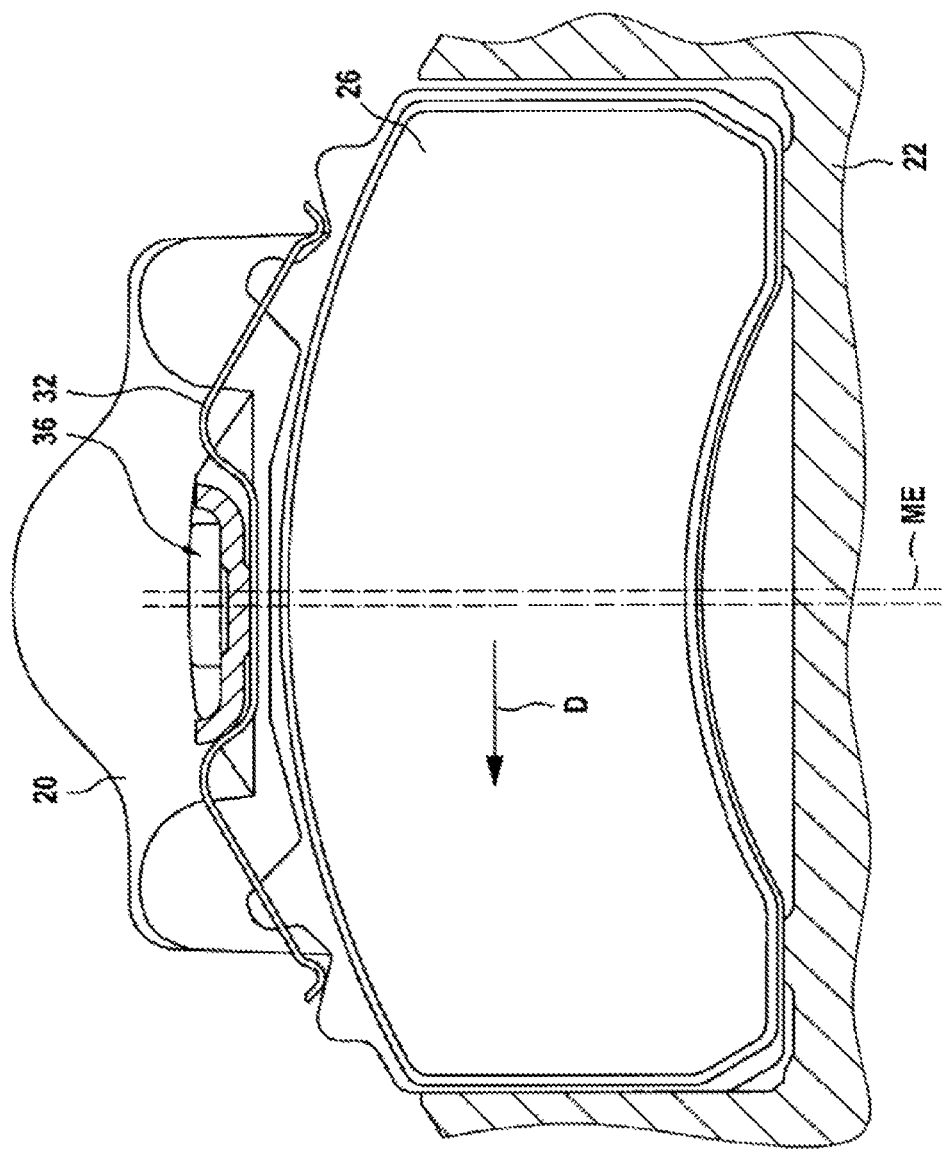
FIG. 6 shows a schematic sectional view of the brake shown in FIGS. 3 and 4.
Figure 7:
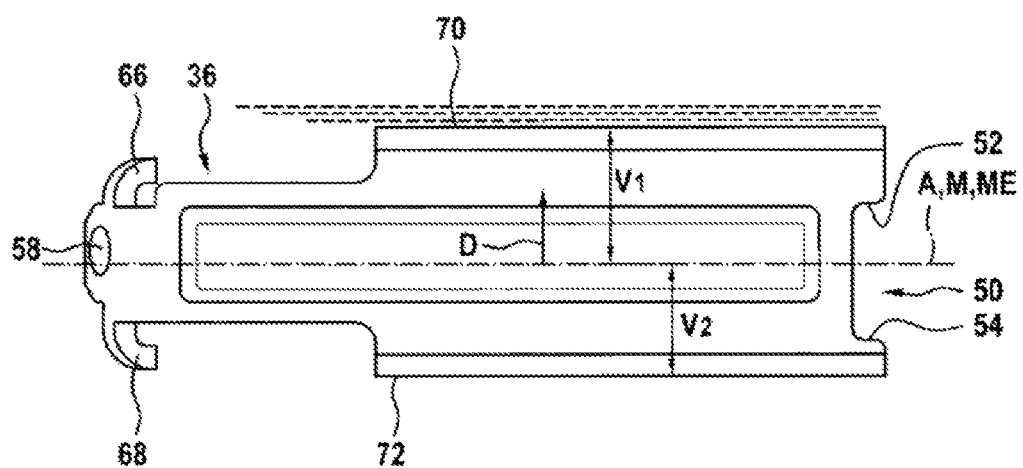
FIG. 7 shows schematically a holding-down clip of the brake shown in FIGS. 3 and 4, FIGS. 8 and 9 show the interaction of the holding-down clip with the brake caliper.
Figure 8:
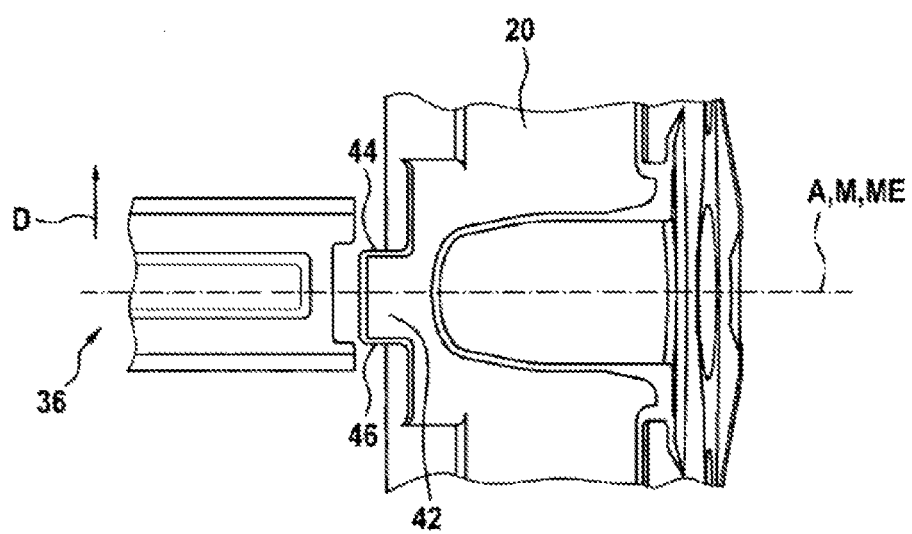
Figure 9:
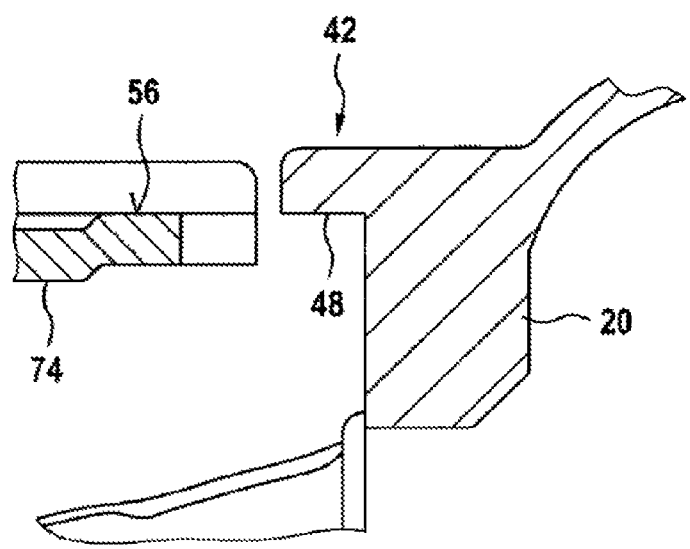
Figure 10:
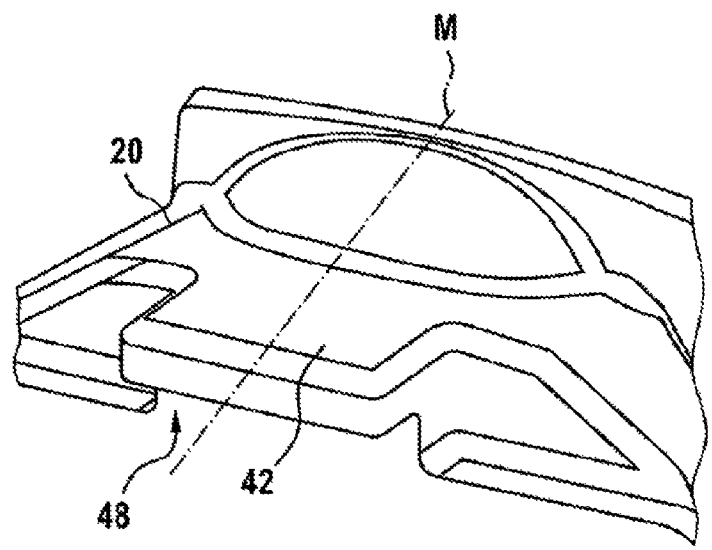
FIG. 10 shows a perspective partial view of a holding region of the brake caliper for the holding-down clip.

The illustrative embodiment of a caliper disc brake according to the invention which is shown in the drawing FIGS. 3-19 has a brake disc (not shown), the axis of rotation of which is denoted by A in FIGS. 3 and 4. The direction of rotation during forward travel is denoted by an arrow D. The brake has a brake caliper 20 and a brake support plate 22, wherein the brake caliper fits around the brake disc (not shown) in the manner of a frame. A brake pad on the rim side, consisting of a metal backplate with a friction lining, is denoted by reference number 24, while an application-side brake pad, consisting of a metal backplate with a friction lining, is denoted by reference number 26, and a pressure plate is denoted by reference number 28. The elements mentioned are force transmission elements. They are held down, i.e. preloaded in a radial direction, by means of holding-down springs 30, 32 and 34, respectively. As will be explained below, brake pad 26 and the pressure plate 28 are also preloaded in a tangential direction.

To hold down the holding-down springs 30, 32 and 34 mentioned, use is made of a holding-down device embodied in the form of a holding-down clip 36, which extends over a caliper opening used to install/remove the brake pads supported on both sides of the brake disc. In this case, the holding-down clip 36 is responsible not only for the radial preloading of the holding-down springs 30, 32 and 34 but also for the tangential preloading of holding-down springs 32 and 34. In contrast, only radial preloading, but not tangential preloading, acts on holding-down spring 30 and brake pad 24. Moments attributable to the tangential preloading of holding-down spring 30 and brake pad 24, which are disadvantageous for the operation of the brake and affect the ease of movement of the sliding caliper, are thereby avoided.

The brake caliper 20, which is a sliding caliper in the illustrative embodiment shown in the drawing, has a holding device for holding and supporting the holding-down clip 36. This holding device includes two regions, namely a rim-side region 38 and an application-side region 40. Both regions are formed symmetrically (in the plan view) with respect to a center line M, which is parallel to the axis of rotation A. They are also symmetrical with respect to a radial center plane ME, which is defined by the axis of rotation A and the center line M. This symmetry means that the contour of the holding device is such that one and the same mold can be used when casting the caliper, irrespective of whether the caliper is designed for a right-hand or a left-hand brake.

The application-side region 40 of the holding device includes a projection 42 resembling a roof edge. Its side flanks 44, 46 serve to absorb tangential forces. Its radially inner flank 48 is used to absorb radial forces.

On the application side, the holding-down clip 36 is embodied to match the projection 42. Thus, it has a recess 50, which receives the projection 42 in the assembled state. In this arrangement, side flanks 52 and 54 of the recess 50 serve to transmit tangential forces. A radially outer surface 56 serves to transmit radial forces. In the installed state, it rests on the flank 48 of the projection 42 facing the brake disc.

In the rim-side region 38, the caliper 20 has a threaded hole 58, into which a screw 60 is screwed to fasten the holding-down clip 36. Like the application-side region 40, the rim-side region 38 of the holding device is embodied symmetrically with respect to the center line M and the center plane ME. Only the threaded hole 58 is not positioned symmetrically so as to prevent a holding-down clip for a right-hand (left-hand) brake from being mounted on a left-hand (right-hand) brake. It is not formed in the casting process but is made by means of a drill and/or of a thread cutter after the actual casting of the caliper.

Figure 11:
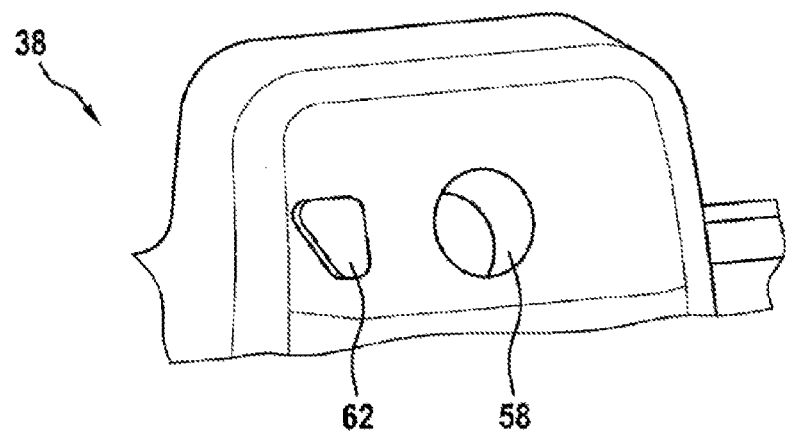
FIG. 11 shows a schematic partial view of a different holding region of the caliper for the holding-down clip.
Figure 12:
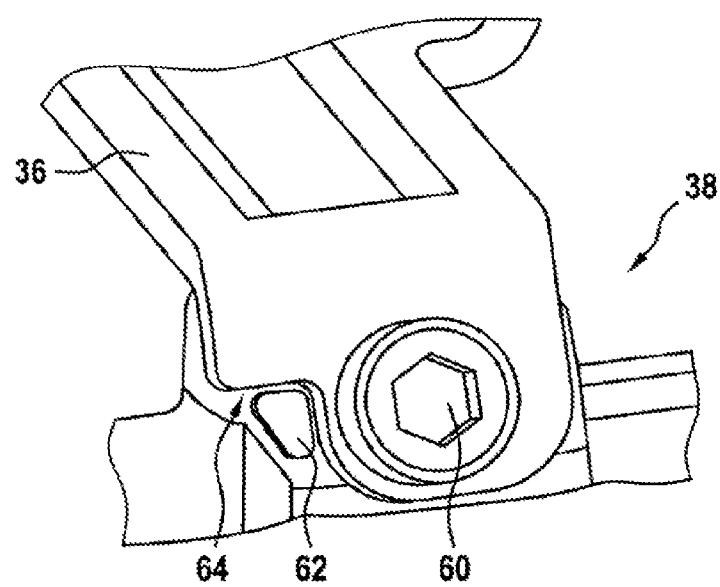
FIGS. 12 and 13 show two different embodiments of the fastening of the holding-down clip on the rim side of the caliper.

A coding device is provided in region 38 of the holding device. For this purpose, a protrusion 62 can be left during the mechanical machining process, as shown in FIGS. 11 and 12, ensuring that, as shown in FIG. 12, only a holding-down clip 36 which has a recess 64 corresponding to the protrusion 62 can be installed. Like the threaded hole 58, the protrusion 62 is not formed by casting and can therefore be arranged asymmetrically.

Figure 13:
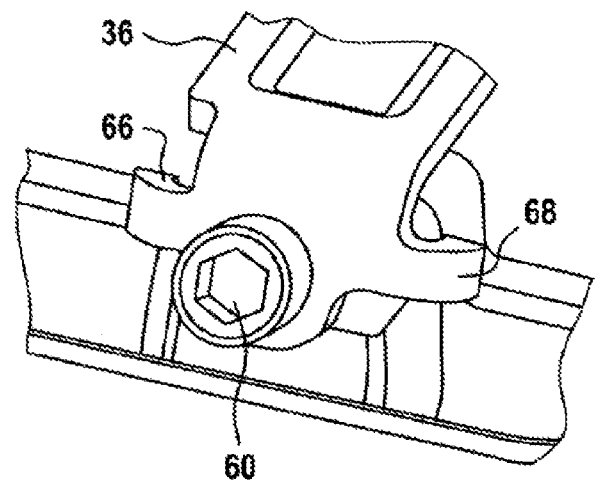

In addition or as an alternative, it is also possible to provide for the holding-down clip 36 to have peg-like projections, as shown in FIG. 13, said projections fitting around corresponding structures on the caliper 20. This, in turn, ensures that only a matching holding-down clip 36 can be installed.

The protrusion 62, the recess 64 and the peg-type projections 66 and 68 are therefore coding devices which ensure that only a matching holding-down clip is ever mounted on the caliper.

The holding-down clip is asymmetrical in two respects. On the one hand, it has tangential projections 70 and 72 only on the application side but not on the rim side. On the other hand, its dimensions V1, V2, measured in a tangential direction from the center line M in the region of the first projection 70, i.e. on the disc exit side, are larger than in the region of projection 72, i.e. on the disc entry side.

By means of this embodiment, it is possible to impose a tangential preload on the application-side brake pad 26 and the pressure plate 28 situated on the application side without having to make the brake caliper 20 correspondingly asymmetrical in the regions 38 and 40 of its holding device for the holding-down clip 36 and without a disadvantageous tangential preload acting on the rim-side brake pad 24.

In interaction with the holding-down springs, it is also possible in a simple manner to selectively control the variation, with the application of different spring preloads. This can be accomplished by a process in which only the width V1 of the holding-down clip has to be modified in the direction of the dashed lines toward the disc exit according to FIG. 7. For this purpose, all that is required is to appropriately design the sheet-metal stamping that has to be formed. In interaction with the abovementioned codings, precise association with the corresponding brake and the conditions of use thereof can be accomplished without the need to make adaptations to the cast regions of the brake caliper.

The holding-down clip 36 is preferably produced as a formed sheet-metal stamping and has a bead which is offset in a manner corresponding to the difference between the dimensions V1 and V2 relative to the center line M and the radial plane R. The bead is denoted by reference number 74. In the assembled state, it rests flat on the respective holding-down spring 30, 32 and 34 and serves to impose the radial preload, cf. FIG. 19. In contrast, there is only linear contact in the embodiment according to FIG. 20, which corresponds to the prior art. Of course, such linear contact subjects the holding-down spring to considerably greater stress than the surface contact according to FIG. 19.

Embodiments of the holding-down spring in the form of a leaf spring can be seen, in particular, in FIGS. 14 to 18. It has two identical spring legs 76, 78 and a trapezoidal central region 80, which is situated in between and projects radially inward. In the relaxed state, the two legs of the trapezoidal region 80 each enclose an angle $\alpha$ of more than 95° with the base of said spring. In the illustrative embodiment shown in the drawing, it is 117°. With the two adjacent spring legs 76, 78, they each enclose an angle $\beta$ of less than 85°. In the illustrative embodiment shown, the angle $\beta$ is 74°.

In side view, the springs are not angular. On the contrary, they are in each case arc-shaped in the transitional region between the two legs of the trapezoidal region 80 and the base thereof, with a radius of in each case 10 mm to 16 mm, 13 mm in the illustrative embodiment shown, and arc-shaped in the transitional region between the trapezoidal region 80 and the spring legs 76, 78, with a radius of 4 mm to 9.5 mm, 7 mm in the illustrative embodiment shown, in the relaxed state.

Figure 14:
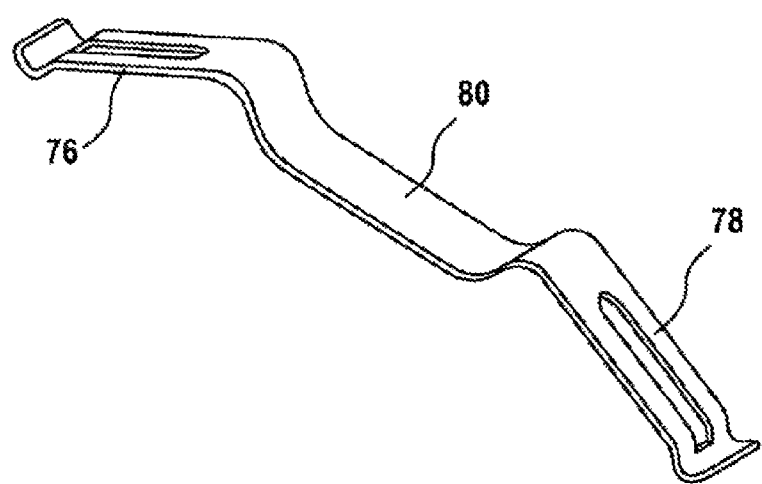
FIGS. 14 to 18 show various views of holding-down springs for the brake shown in FIGS. 3 and 4, and FIGS. 19 and 20 show sectional views of the interaction of the holding-down clip with the holding-down spring according to an illustrative embodiment of the invention in FIG. 19 and according to the prior art in FIG. 20.
Figure 15:
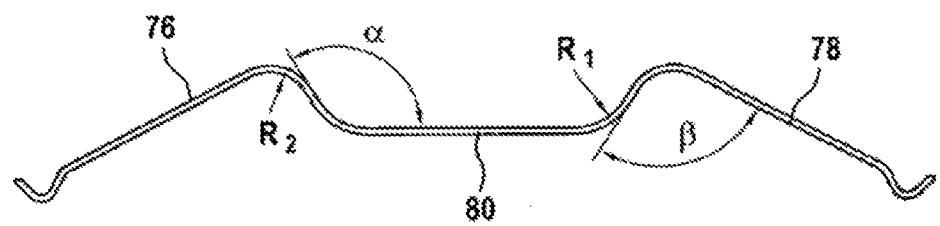
Figure 16:
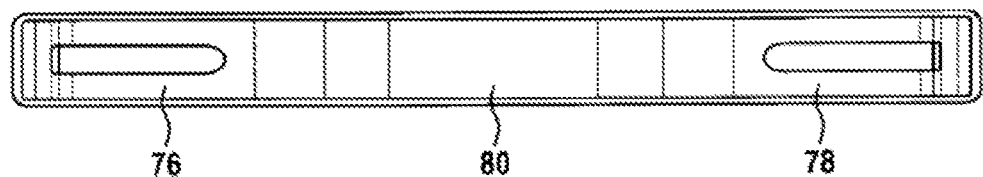
Figure 17:
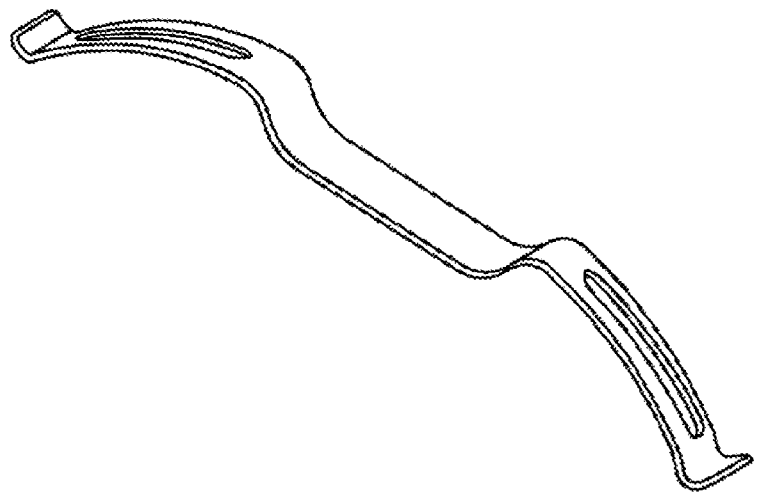
Figure 18:
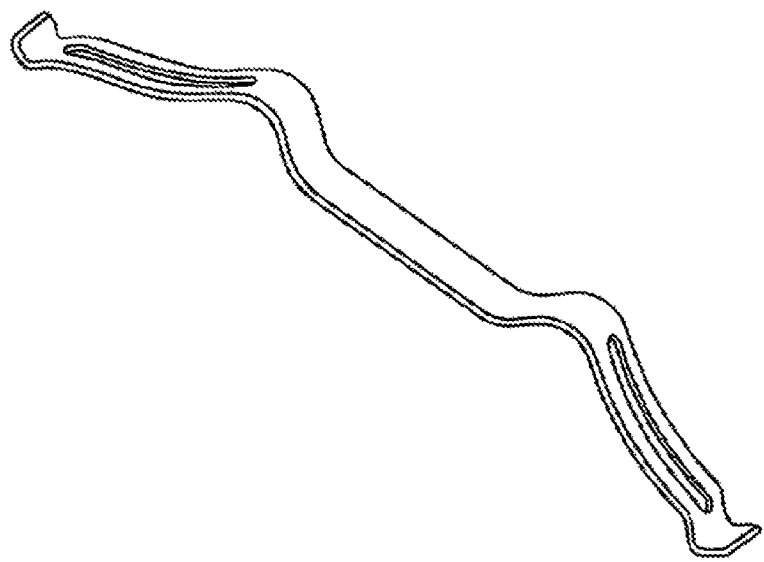

According to FIGS. 14 to 16, the spring legs 76, 78 can be straight. However, they can also be of convex or concave configuration, as can be seen from FIGS. 17 and 18.

Figure 19:
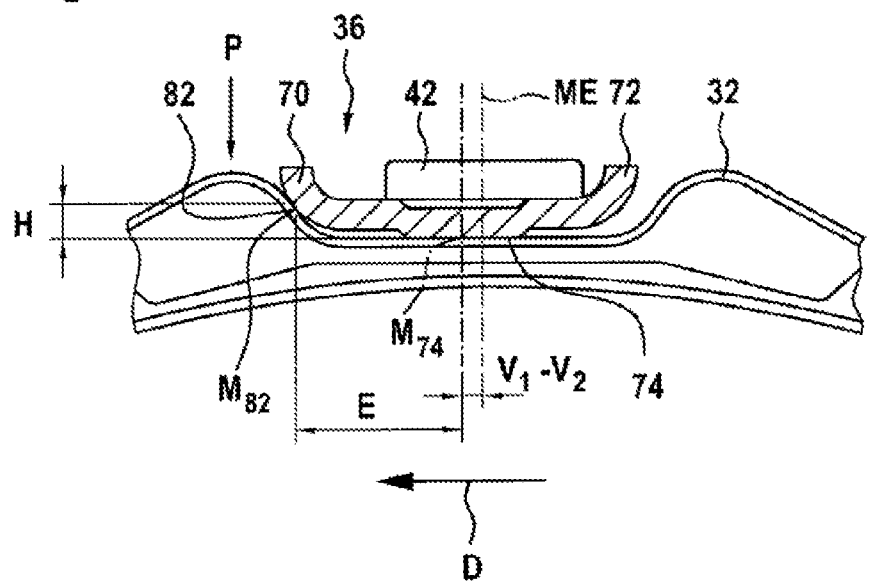

The region of the projection 70 which rests on holding-down spring 32 is denoted by reference number 82 in FIG. 19. Its central point M82 is at a distance H in a radial direction and at a distance E in a tangential direction from the central point M74, wherein H<E. In contrast, the corresponding contact lines 15 and 16 in the prior art are such that H=E, cf. FIG. 20.

In the illustrative embodiment shown in the drawing, the location P of the highest (compressive) stress in holding-down spring 32, which is in the transitional region between the central region 74 and spring leg 76, is at a long distance from the (two dimensional) region of the greatest wear due to friction or radial impact of the brake pad or pressure plate in the contact regions.

Figure 20:
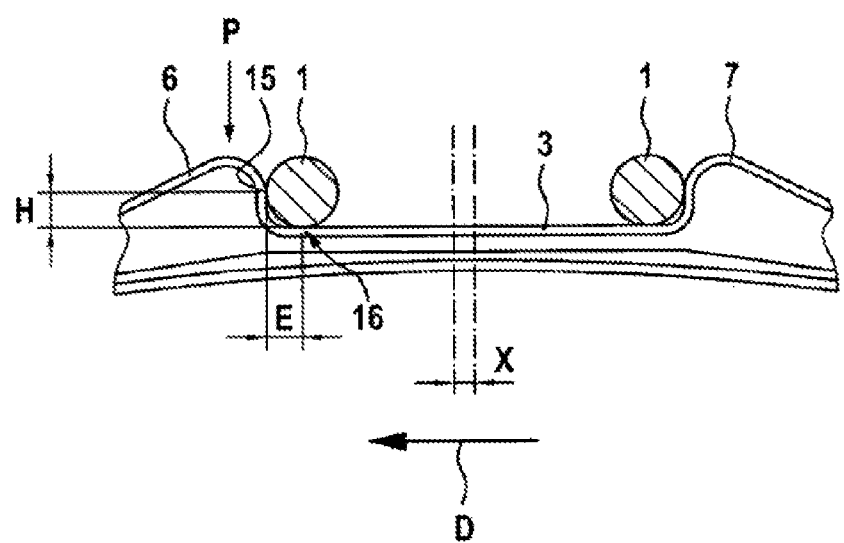

In the same conditions of use as those mentioned above, there is in contrast only linear contact in the radial contact region according to the prior art in FIG. 20, and therefore, in this case, the location of greatest wear in the radial region with the linear contact (see arrow) then directly and closely adjoins the region P of the highest (compressive) stress in the holding-down spring, wherein here H=E.

As can be seen especially from FIG. 19, the holding-down clip 36 has a trough-type configuration in cross section and is angled obliquely at the outside, i.e. at the end of the projections 70, 72. As a result, slight relative movements (sliding) are possible in the case of reversing movements of the holding-down spring. In the prior art shown in FIG. 20 with the round stock, which rests on vertical spring portions, this is not the case. The configuration according to the invention reduces the loads in the critical zones.

Figure 1:
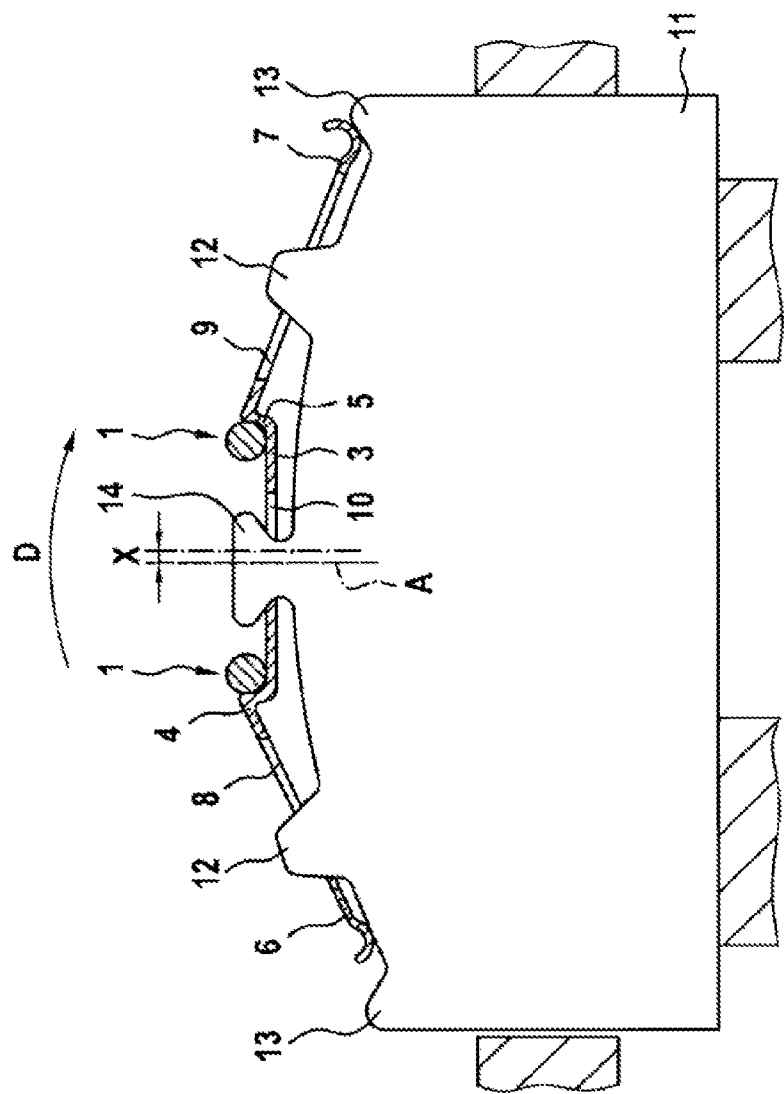
FIGS. 1 and 2 show caliper disc brakes according to the prior art.
Figure 2:
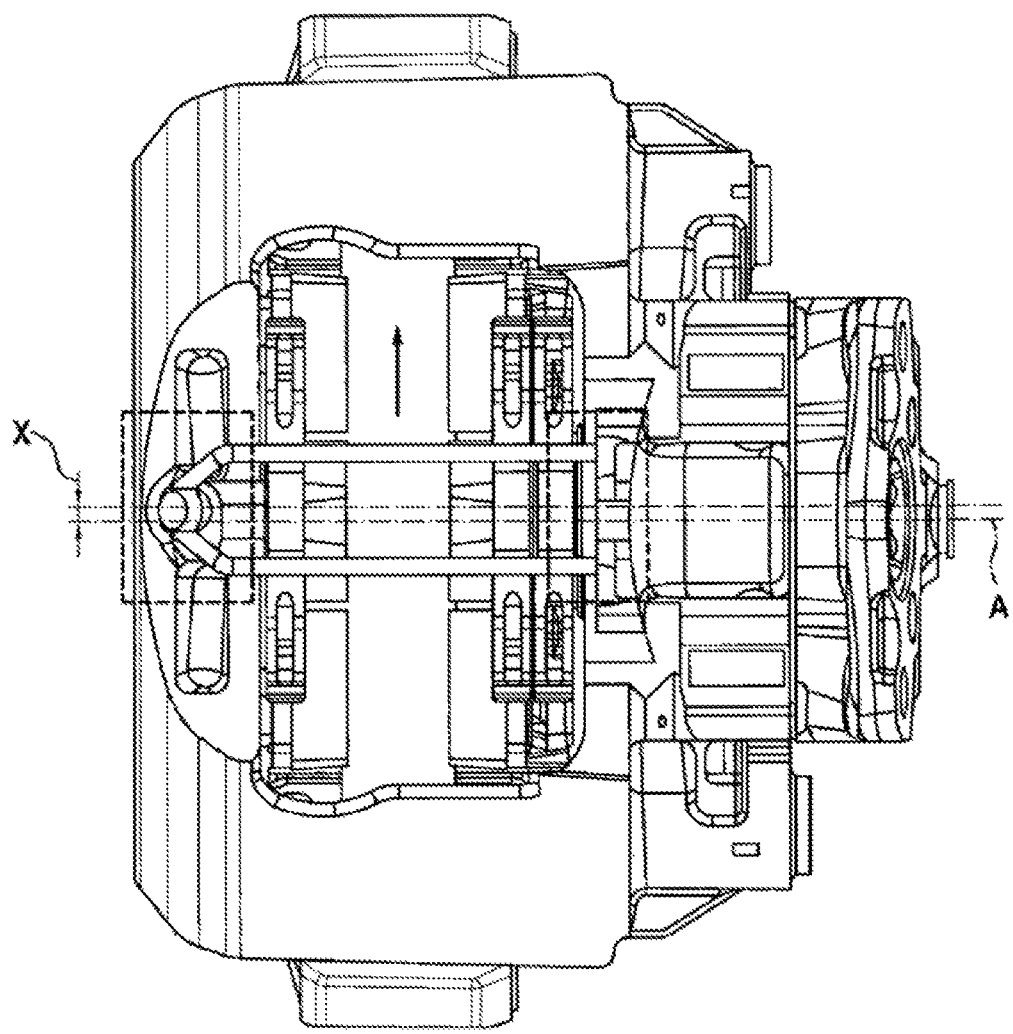

As in the prior art shown in FIG. 1, the holding-down springs are coupled to the brake pad in the axial direction of the brake pads in this case too because radial projections 12 from the outer edge of the brake pad pass through elongate openings 8, 9 in the two lateral spring legs of the spring. At the ends, the spring legs rest against further radial projections 13, 13 on the outer edge of the brake pad. The holding-down springs are designed as leaf springs.

The features of the invention which are disclosed in the above description, the claims and the drawing can be significant either individually or in any desired combinations for the implementation of the invention in its various embodiments.

While the above description constitutes the preferred embodiments of the present invention, it will be appreciated that the invention is susceptible to modification, variation and change without departing from the proper scope and fair meaning of the accompanying claims.

What is claimed is:
1. A caliper disc brake of a vehicle, with
  a brake disc having an axis of rotation (A),
  a brake caliper (20),
  a brake support plate (22),
  a force transmission element, which is guided and supported in a well of the brake caliper or of the brake support plate,
  a holding-down spring (30, 32, 34) for holding down the force transmission element, and
  a holding-down device (36), which
    is held and supported on the caliper by a holding device (38, 40),
    preloads the holding-down spring radially against the force transmission device, and preloads the holding-down spring tangentially in the direction of rotation (D) against the force transmission device during forward travel, wherein the holding-down device has a center line (M) parallel to the axis of rotation, wherein the holding-down spring (30, 32, 34) has two identical spring legs (76, 78) and a trapezoidal central region (80), wherein the holding-down device (36) rests on the holding-down spring (30, 32, 34) in a bead-shaped first region (74) that produces the radial preload and rests on the holding-down spring in a second region (82) that produces the tangential preload, and the distance between a central point ($M_{74}$) of the first region and a central point ($M_{82}$) of the second region is smaller in a radial direction than in a tangential direction (H<E).

2. The caliper disc brake as claimed in claim 1, wherein the trapezoidal central region has a base between two trapeze legs and in the relaxed state, the holding-down spring (30, 32, 34) in each case extends in an arc with a radius ($R_1$) of 10 mm to 16 mm in a transitional region between the two trapeze legs of the trapezoidal central region and the base thereof and in an arc with a radius ($R_2$) of 4 mm to 9.5 mm in the transitional region between the trapezoidal region and the spring legs (76, 78).

3. The caliper disc brake as claimed in claim 1, wherein the holding-down spring is symmetrical and, owing to the symmetry, is adapted to be installed in two installation positions rotated by 180° relative to one another.

4. The caliper disc brake as claimed in claim 1, wherein the holding-down spring (30, 32, 34) is a leaf spring.

5. A holding-down spring of a caliper disc brake of a vehicle, having two identical spring legs (76, 78) and a trapezoidal central region (80) with two trapeze legs and a base, which is located between the two spring legs and projects radially inward, wherein the two trapeze legs of the trapezoidal region each enclose an angle ($\alpha$) of more than 95° with the base in a relaxed state and an angle ($\beta$) of less than 85° with a respectively adjacent one of the two spring legs in a location where each of the trapeze legs meets the respectively adjacent one of the two spring legs.

6. The holding-down spring as claimed in claim 5, wherein in the relaxed state, the holding-down spring extends on each of two opposite sides in an arc with a radius ($R_1$) of 10 mm to 16 mm in a transitional region between the two spring legs of the trapezoidal region and the base and in an arc with a radius ($R_2$) of 4 mm to 9.5 mm in a transitional region between the trapezoidal region and the spring legs (76, 78).

7. The holding-down spring as claimed in claim 5, wherein the holding-down spring is symmetrical and, owing to the symmetry, is adapted to be installed in two installation positions rotated by 180° relative to one another.

8. The holding-down spring as claimed in claim 5, wherein the holding-down spring is a leaf spring.

\* \* \* \* \*